March 9, 1971  S. NOBLE  3,568,336

REMOTE-CONTROLLED EDUCATIONAL GAME

Filed May 8, 1969  4 Sheets-Sheet 1

INVENTOR.
SID NOBLE
BY Robertson, Bryan,
Parmelee & Johnson

March 9, 1971  S. NOBLE  3,568,336

REMOTE-CONTROLLED EDUCATIONAL GAME

Filed May 8, 1969  4 Sheets-Sheet 2

INVENTOR.
SID NOBLE

BY Robertson, Bryan,
Parmelee & Johnson.

INVENTOR.
SID NOBLE

United States Patent Office 3,568,336
Patented Mar. 9, 1971

3,568,336
REMOTE-CONTROLLED EDUCATIONAL GAME
Sid Noble, West Orange, N.J., assignor to
Remco Industries, Inc., Harrison, N.J.
Filed May 8, 1969, Ser. No. 822,988
Int. Cl. A63h 33/26
U.S. Cl. 35—32                                10 Claims

ABSTRACT OF THE DISCLOSURE

A remote-controlled educational game with an answering toy, such as a dog, is provided. The remote-control unit transmits electrical pulses to the toy. Actions of the child, such as arranging pegs in the control unit, determine the number of pulses sent for each cycle of operation of the actuating switch. Each pulse received by the toy actuates a cycle-timer in the toy for one cycle of operation. A cycle of operation would include, for example, having the dog's mouth open and emit a barking sound. Thus, the dog would bark once for each pulse, that is, would bark as many times as had been predetermined by the child's actions.

SUMMARY OF THE INVENTION

Generally, this toy includes (1) a remote-control unit generating a pre-determined number of electrical pulses in response to actions by a child, and (2) an answering toy electrically connected to the control unit to respond physically and/or audibly to the electrical pulses.

In my preferred form, the remote control unit resembles a book and the toy is an animated dog. The book contains a number of movable pages, each page having a different number of holes, between one and ten, located therein. The child inserts an interruptor or peg into each hole of the page selected and presses a start switch to actuate the control unit.

When the start switch is pressed, a motor mounted in the control unit is momentarily energized. The action of the motor closes a cycle-timer switch to continue operation of the motor for a full cycle even if the switch is released. During this cycle one or more pulses will be sent to the toy to animate it. One cycle of animation will result from each pulse.

A rotatable switch in the control unit, operated by the motor, rotates only while the cycle-timer switch is closed. As it rotates, a projecting member passes by the peg holes. Every time the member hits a peg in one of the peg holes, placed there by the child, a switch contact is closed, sending a pulse to the toy. Thus, the toy receives as many pulses during one cycle as there were pegs present.

When the toy receives the pulse, a motor located therein is momentarily energized closing a second cycle-timer switch so that motor will operate for a full cycle.

The toy dog includes a head having an upper portion arranged to pivot by cam action with respect to a lower portion and an associated noisemaking bellows to simulate barking. Each cycle of operation of the toy has the dog's mouth open and has the dog make a barking noise.

Thus, the number of pegs inserted into the peg holes will determine the number of pegs the projecting member will hit during one rotation and, therefore, the number of pulses sent to the toy during a cycle of operation of the control unit. This will determine the number of cycles of operation of the toy.

For best operation there should be sufficient time between the pulses received by the toy to enable the toy to complete a full cycle of its operation.

Since the toy animal will give correct audible responses to each of a variety of stimuli selected by a child, the child gets the impression that the toy animal is "intelligent."

It should be apparent that, in addition to resembling a book, the top of the control unit may also be adapted to be a game, a puzzle, or the like. Likewise, the remotely-operated toy can take many forms.

DETAILED DESCRIPTION

A remote-controlled unit 14 is electrically-connected to a separate and responsive answering toy dog 16 by leads 28. The control unit resembles a book and has a transmitting mechanism mounted therein. When the transmitting mechanism is activated, a pulse is transmitted to the toy dog causing its mouth to open and a barking sound to be emitted. The number of times the dog's mouth will open and emit a sound is controlled by the number of pulses received from the transmitting mechanism. The number of pulses, in turn, is controlled by the actions of the child.

THE CONTROL UNIT

Figure 1:
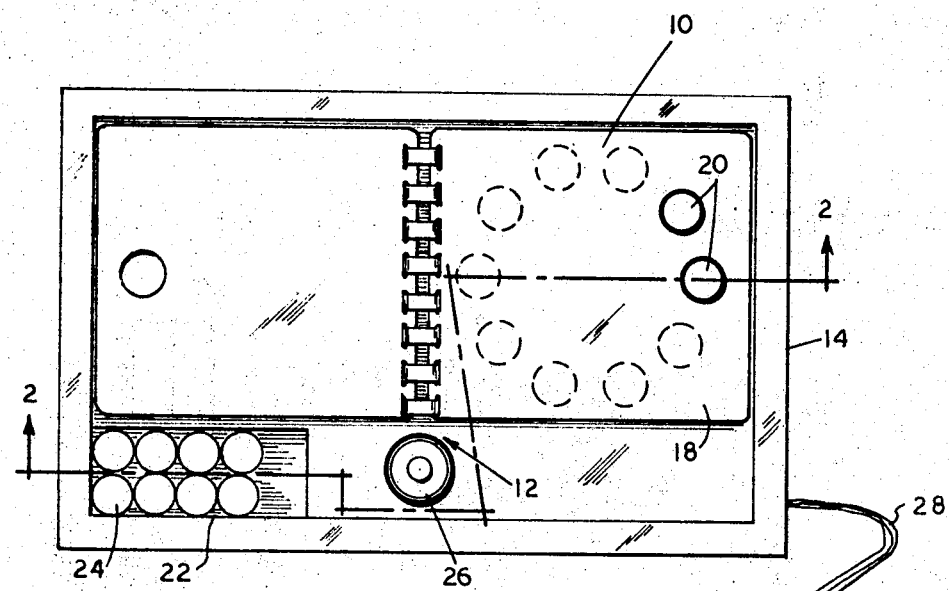
FIG. 1 is a top view of the pulse-transmitting book and side view of the electrically-connected answering toy dog.

As shown in FIG. 1, the control unit 10 includes a book 12 and book support housing 14 electrically connected by leads 28 to a toy dog 16. The book 12 contains a number of movable pages 18 which are arranged on the support housing 14 so that an individual page 18 can be turned by the child. The pages 18 have various questions or other information printed thereon (not shown) to which the toy dog 16 will supply the proper "answer." The pages 18 have various combinations of holes 20 extending therethrough so that when a child selects a page 18 the various holes 20 extend into contact with the support housing 14. Normally the first page will have only one hole and each page below an additional hole. Thus, as more pages are turned, more holes are exposed.

Mounted on support housing 14 is a peg container 22 having at least as many pegs 24 as the page 18 containing the largest number of holes 20. The pegs 24 are constructed to be easily insertable into the page holes 20.

A pushbutton switch 26 which the child presses to activate the control unit 10 is also mounted to the support housing 14. When the control unit 10 is activated, a number of electrical pulses equal to the number of pegs 24 inserted in the page holes 20 will be intermittently transmitted to the toy dog 16 by leads 28.

The toy dog 16 normaly has his mouth closed. However, as will be described below, once a pulse is transmitted to the receiving unit 32 the mouth of the dog will open and a barking sound will be emitted.

Figure 2:
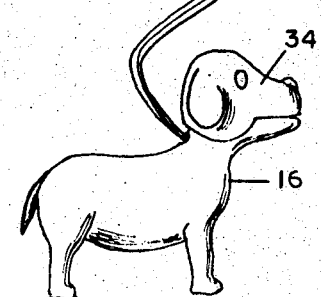
FIG. 2 is a sectional view along lines 2—2 of FIG. 1 generally showing the control unit.
Figure 2:
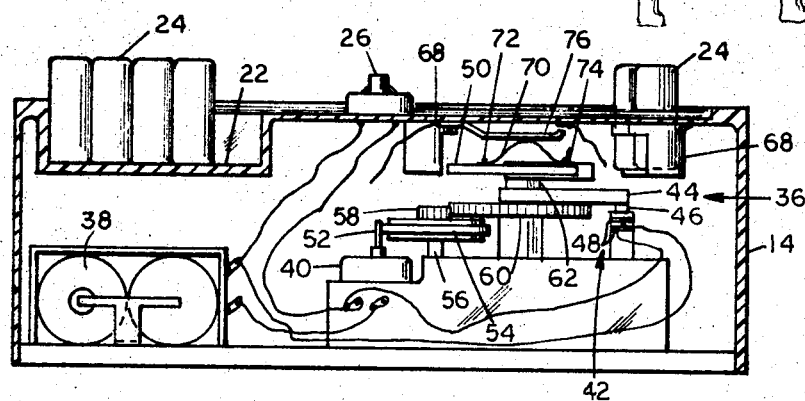
Figure 3:
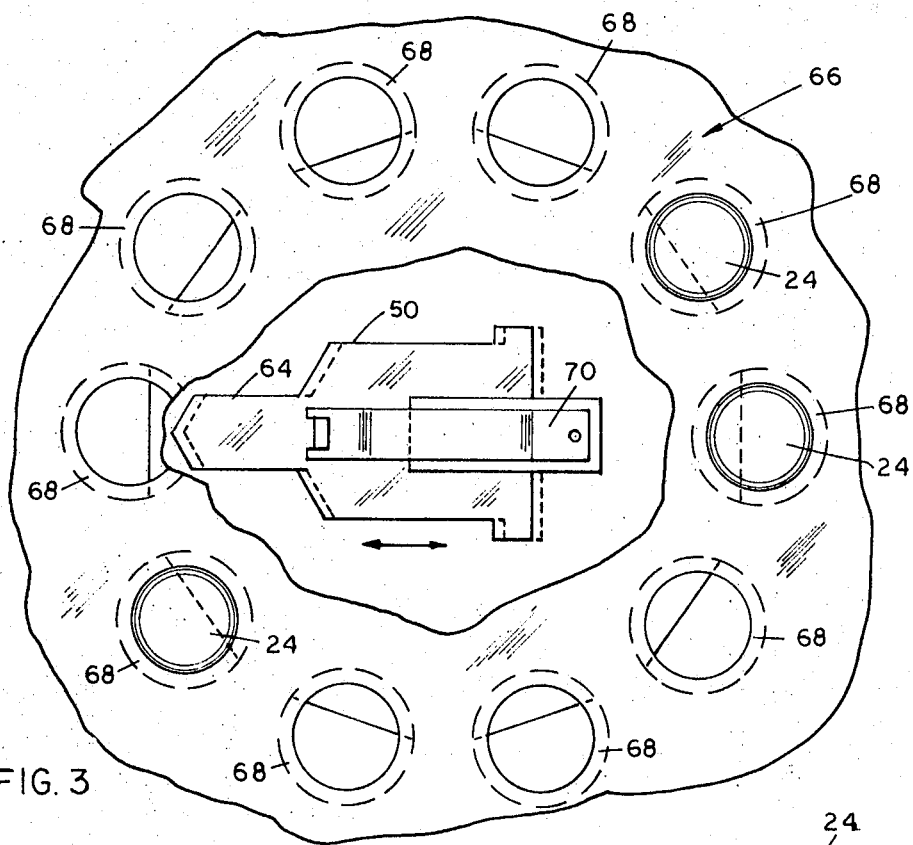
FIG. 3 is a top partial sectional view showing the relative position of the peg holes and slidable switch actuator.
Figure 4:
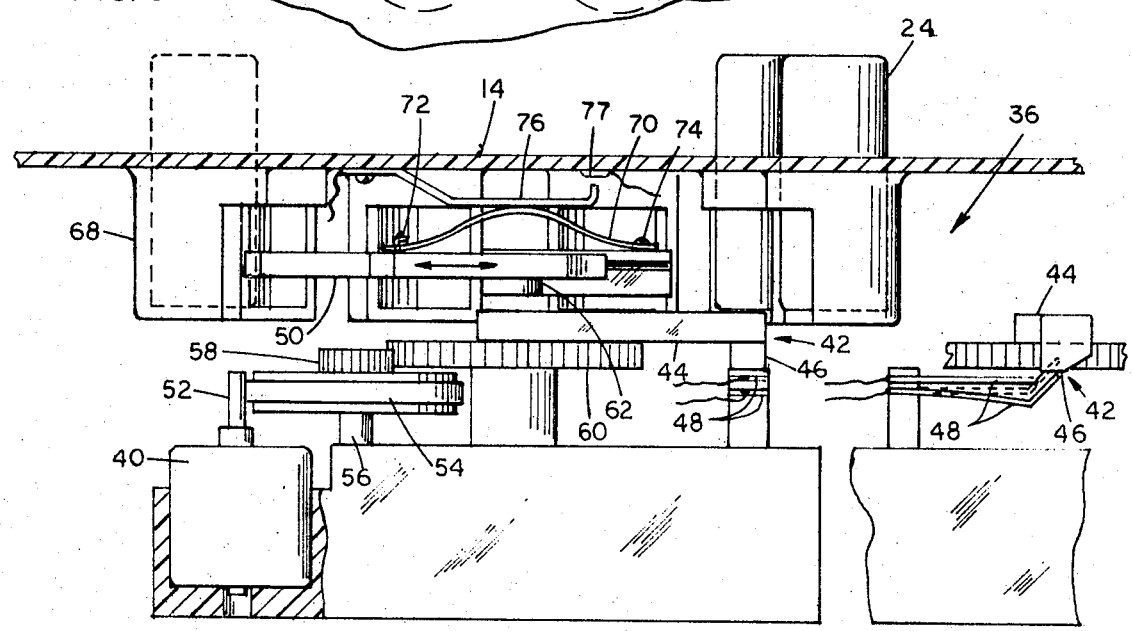
FIG. 4 is an enlarged side view of the transmitting mechanism and cycle-timer switch in the control unit.

FIGS. 2, 3, and 4 generally show the pulse transmitting mechanism 36 mounted in the support housing 14. The pushbutton switch 26 connects a battery 38 and a motor 40. Motor 40 has spindle 52 in contact with friction gear 54, on shaft 56. Spur gear 58, also on shaft 56, engages gear 60 on shaft 62. Together these make up a reducing gear train, so shaft 62 turns slowly as motor 40 rotates.

Shaft 62 carries arm 44 of cycle-timer switch 42 and switch actuator 50 of the pulse transmitting circuit.

The cycle-timer switch 42 includes a rotatable arm 44 operatively connected through a gear train with the motor 40 and rotatable by it. Extending downwardly from the arm 44 is a lug 46 which engages with one of a pair of resilient spring-like contacts 48. The resilient contacts 48 are then spring-pressed closed, providing a closed circuit between battery 38 and motor 40 for a full cycle, until the lug 46 again engages one of the resilient contacts 48. This provides a cycle-timer for the control unit; and its rotation time defines one cycle of operation of the transmitting mechanism 36.

As shown in FIG. 3 the pulse transmitting mechanism 36 includes a switch actuator 50 rotated by motor 40. One complete revolution of the switch actuator 50 corresponds to one revolution of the arm 44 and lug 46; i.e., the time period during which the cycle-timer switch 42 is closed. The rotating switch actuator 50 has a projecting portion 64 which sweeps through a predetermined circular pattern 66, as the switch actuator 50 rotates, to sense the presence of pegs.

The control unit housing 14 has a number of equally-spaced peg slots 68, here ten, arranged in a circular pattern 66 along whose arc the projecting portion 64 of the switch actuator 50 sweeps. Each hole 20 in a page 18 will match one peg slot 68 in the support housing 14. For example, if the page 18 selected by the child has three holes 20 arranged therein the child must insert one peg 24 through each page hole 20 into the peg slot 68 located thereunder. With the pegs 24 in position, the projecting portion 64 of the actuator 50 will sweep through each peg slot 68 along the circle 66 contacting a portion of each peg 24 located therein.

As shown generally in FIG. 2 and in more detail in FIG. 4, the switch actuator 50 is slidably mounted to the shaft 62. It includes a flexible contact strip 70 having one end 72 rigidly attached to the slidable switch actuator 50. The other end 74 is rigidly and fixedly mounted proximate to the switch actuator 50, but on the opposite side of shaft 62. Strip 70, as mounted, is slightly arcuate, and so tends to press the slidable actuator radially outwardly. With such an arrangement of the flexible contact strip 70, and the switch actuator 50, rearward sliding movement of the switch actuator 50, caused by the temporary engagement of the projecting portion 64 of the actuator 50 with a peg 24, will force the flexible contact strip 70 to bulge further upward.

As shown in FIG. 4, the projecting portion 64 of the base 50 is not in contact with a peg, and the flexible contact strip 70 is in its normal position. A normally-open toy actuating switch 76, with contact 77, is interposed in the circuit between the power source 38 located in the support housing 14 and a motor 78 mounted in the toy dog 16. Switch 76 is located above strip 70 such that upward movement of the flexible contact strip 70 exerts pressure on the toy actuating switch 76 thereby pressing it against contact 77 and closing it.

The pressure on the toy actuating switch 76 is maintained while the projecting portion 64 is in contact with a peg 24, during which time an energy pulse is applied to the motor 78. Thus, member 64 moves radially every time a peg is contacted. This radial movement closes switch 76 and sends a pulse of electricity to the remotely-located toy through leads 28.

THE ACTUATED TOY

Figure 5:
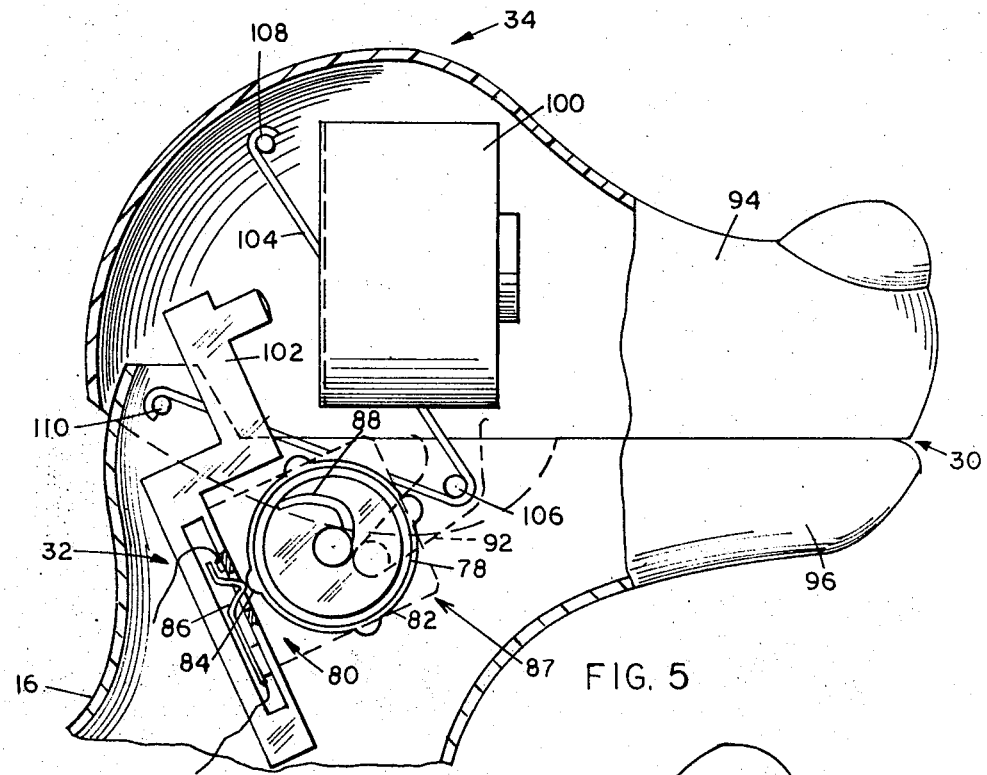
FIG. 5 is a partial sectional view of the head of the answering toy and receiving unit when its mouth is closed.
Figure 6:
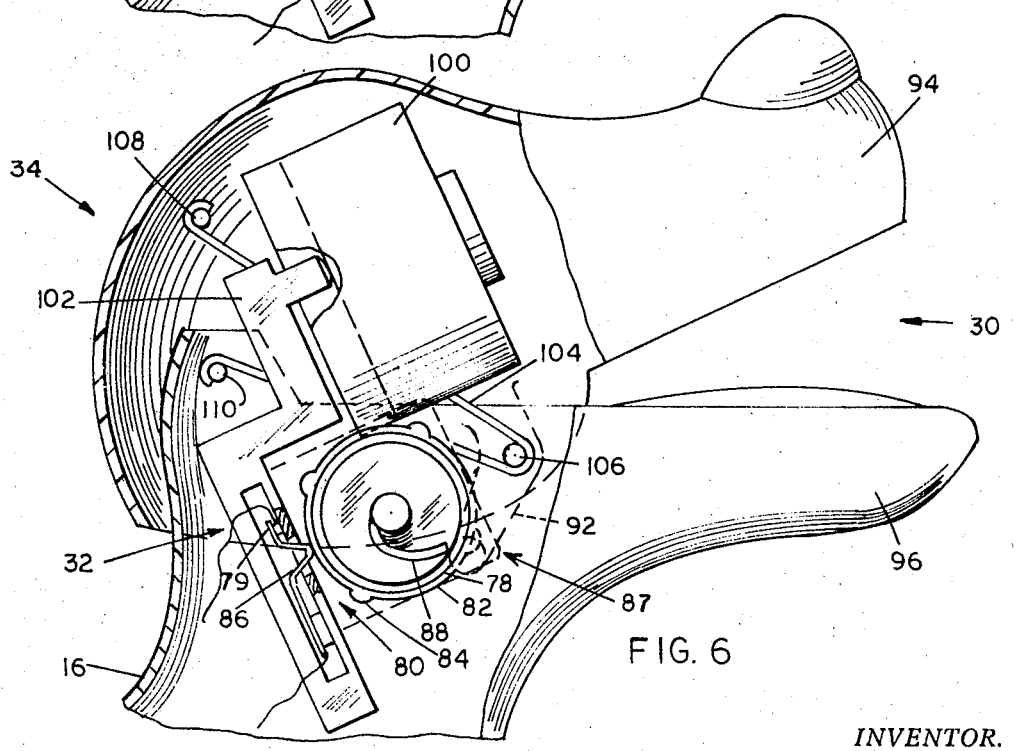
FIG. 6 is a partial sectional view of the head of the answering toy and receiving unit when its mouth is open.

The animated portion of the toy, here a dog, is best seen in FIGS. 5 and 6. The dog's head 34 has an upper jaw 94 pivotally connected to its lower, fixed jaw 96.

The head 34 includes a motor 78 and a cycle-timer 80 associated with the motor to control it. Timer 80 includes normally-closed leaf switch 79 and a disc 82 having extending detents 84. The discs are positioned relative to switch 79 such that detents 84 will contact switch 79 and open it as the disc is rotated. I have identified the motor 78, switch 79, and associated parts as receiving unit 32. Disc 82 is operated by motor 78 through reducing gears 98.

The power supply for toy 16 is the battery 38, preferably located in the control unit 14. Battery 38 is in series with motor 78 and switch 79.

As the receiving unit 32 receives a pulse through leads 28, the motor 78 is momentarily energized moving the detent 84 away from engagement with the leaf switch 86, thereby closing it. The closing of the leaf switch 86 closes the circuit between battery 38 and the motor 78 until the leaf switch 86 is again engaged by a detent 84. This time period is preferably greater than the period during which the toy actuating switch 76 is closed, but less than the time period between successive pulses.

As seen in FIGS. 5 through 9, cam 88, is also operatively associated with the motor 78. The cam 88 is rotated by the action of the motor 78, through reducing gears, thereby engaging a cam follower 92. The cam follower 92 is rigidly mounted at its upper end to upper head portion 94. Its lower end in lower head portion 96, presses against cam 88. Upon rotation of cam 88 sufficient force is applied to the cam follower 92 to move the upper head portion 94 away from the lower head portion 96, simulating the movement of a dog opening its mouth 30.

As the cam 88 is rotated by motor 78, disc 82 is also rotated through reducing gears 98. The reducing gears 98 slow the rotation of the disc 82 allowing the cams 88 to complete its action on the cam follower 92 before another detent 84 engages leaf switch 86, thereby de-energizing the motor 78. (See FIGS. 7, 8, and 9.) This provides one cycle of operation of the toy.

As shown in FIGS. 5 and 6, a noisemaking bellows 100 is rigidly mounted in the upper head portion 94. When the upper head portion 94 moves away from the lower head portion 96, by action of cam 88 and cam follower 92, the bellows 100 engages a bellows actuator 102 fixedly mounted in the lower head portion 96. This compressive action on the bellows 100 results in the emission of a barking sound when the dog's mouth 30 is opened.

A spring 104 mounted on pivoting shaft 106 has one end 108 rigidly attached to the upper head portion 94 and the other end 110 rigidly attached to the lower head portion 96. As the mouth 30 of the dog 16 is made to open, the spring 104 is placed under tension so that, when the cam 88 disengages the cam follower 92, the mouth 30 is spring-pressed closed.

THE CIRCUIT

Figure 10:
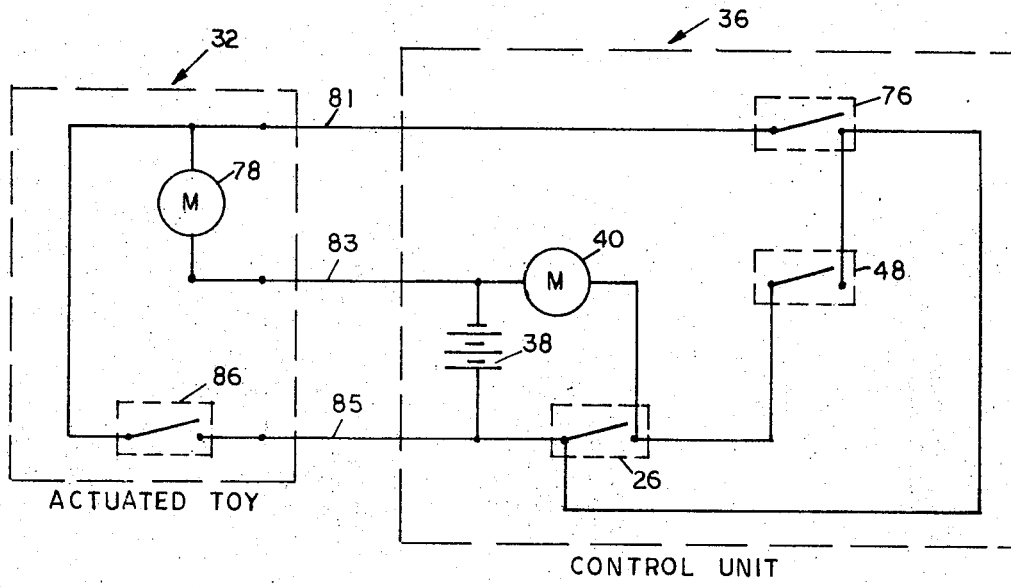
FIG. 10 is a schematic diagram of the electric circuit.

The circuit is shown in FIG. 10. It includes a control unit section, on the right, and the actuated toy section, on the left. Three leads 81, 83, and 85 interconnect the sections, and are together lead 28 of FIG. 1.

The control unit section includes battery 38, motor 40, and normally-open starting switch 26 in series. Cycle-timer switch 48 is in parallel with switch 26. Switch 76 connects one terminal of battery 38 (as shown, the positive terminal) with lead 75 going to the toy.

The actuated toy section includes motor 78 and cycle-timer switch 86 in series with leads 83 and 85 which go to the negative and positive sides of battery 38, respectively. Thus, motor 78 is connected to one side of battery 38 through lead 83, and may be connected to the other side of the battery through either lead 81 or lead 85.

When the push button switch 26 in the control unit is closed, the motor 40 is energized by the battery 38. This action of the motor 40 closes cycle-timer contacts 48 providing a complete circuit path to the motor 40 even after the push button switch 26 is released. The motor will then rotate for one cycle.

During this cycle switch 76 will close one or more times depending upon the number of pegs the child has previously inserted in the peg holes. Each time switch 76 is momentarily closed, the circuit to motor 78 in toy 16 will be closed, causing it to start. Motion of motor 78 closes toy cycle switch 86, thus connecting motor 78 to battery 38 through leads 83 and 85. Thus, motor 78 will operate for one cycle of switch 86. One such cycle will be completed for each pulse received from switch 76.

OPERATION

I will now describe the operation of the transmitting mechanism and receiving units 36 and 32, respectively, in conjunction with the actions of a child operator.

Referring to FIG. 1, initially the child chooses the page he desires. He then removes a number of pegs 24 from the peg container 22 equal to the number of holes 20 in the page 18 selected. The pegs 24 are then inserted into the page holes 20 into peg slots 68. The control unit 10 is now ready for operation, and the child commences operation of the transmitting mechanism 36 by pressing the push button switch 26.

Referring to FIGS. 2 and 4, when the push button 26 is depressed, the motor 40 is energized by the battery 38. The action of the motor 40, through the gear train rotates actuator shaft 62 having a slidable switch actuator 50 and arm 44 rigidly attached thereto.

The arm 44 has a lug 46 located thereon which is normally engaging one of a pair of resilient spring-like contacts 48. When the actuator shaft 62 is rotated, the lug 46 moves away from the resilient contacts 48 allowing them to close by their own resilient interaction. Once the contacts 48 close, a complete energy path is provided from the power source 38 to the motor 40 until the cam 44 and lug 46 have undergone one complete revolution and the lug 46 again engages one of the pair of contacts 48, thereby opening them. While the contacts 48 are closed, the motor 40 is continuously being energized so that the slidable switch actuator 50 continues to rotate. This provides the cycle-timer for the control unit.

The switch actuator 50 rotates about shaft 62 through a circular pattern of equally-spaced peg slots 68. As switch actuator 50 rotates, projecting portion 64 will sweep through a small portion of each peg slot 68. If no peg 24 is in the peg slot 68, the projecting portion will continue its circular sweep. However, should a peg 24 be encountered, the switch actuator will be forced to slide rearward, to the position shown by the dotted lines in FIG. 3, and the flexible contact strip 70 will bulge sufficiently upwardly to force the normally-open toy actuating switch 76 to close.

The closing of the toy actuating switch 76 momentarily closes the circuit between power source 38 to the toy's motor 78, and so the motor 78 receives a pulse and is temporarily energized. When the motor 78 receives the pulse, the motor spindle 90, connected thereto, rotates turning reducing gears 98 which rotate the disc 82 and detents 84 located thereon.

Figures 7, 8, 9:
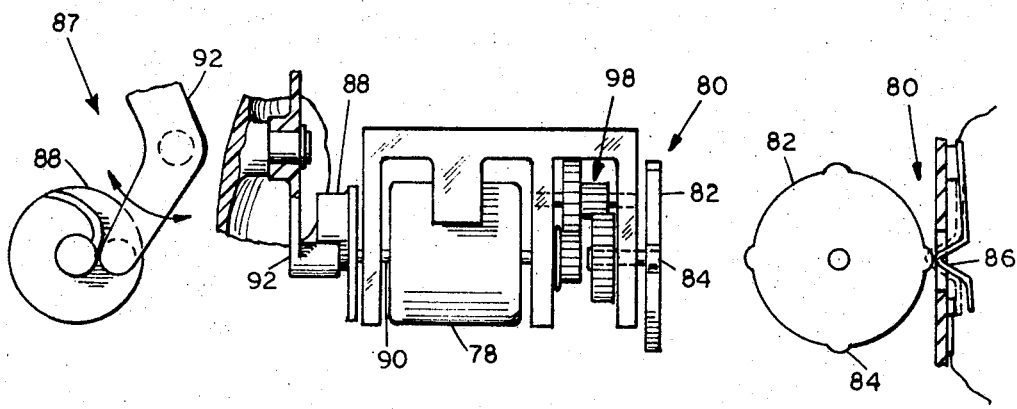
FIGS. 7, 8 and 9 are left, front and right views of the receiving unit contained in the head of the toy.

As shown in FIG. 7, detent 84 is normally in contact with the leaf switch 86. However, when motor 78 is energized, the motor 78 rotates the detent 84 away from contact with the switch 86 and so allows it to close. When the leaf switch 86 is closed, a complete energy path is maintained from the power source 38 to the motor 78 until the disc 82 has rotated enough so that another detent 84 engages and opens the leaf switch 86.

As shown in FIGS. 5 and 6, while the leaf switch 86 is closed, cam 88, operatively associated with the motor spindle 90, rotates. Rotating cam 88 engages cam follower 92 and presses against it. Cam 88 creates sufficient force on the cam follower 92 so that the upper head portion 94 moves away from contact with the lower head portion 96, simulating the opening of the dog's mouth 30. At the same time, when the upper head portion 94 pivots away from the lower head portion 96, bellows 100 will engage the bellows actuator 102 causing the emission of a sound resembling the barking of a dog.

As can be seen, a unique remote toy and associated control unit has been provided having the benefit of interacting cycle switches. The cycle switch within the control unit causes the control to go through one full cycle of operation when started by the child. During this cycle a specified number of pulses corresponding to the setting selected by the child are transmitted to the remote toy. The pre-setting means can take various forms, such as the use of pegs to cause closing of electrical switches, or may be any other convenient structure that will cause pulses to be transmitted.

With the embodiment as herein described any number of pegs 24 between one and ten may be used in the control unit 10. For each peg 24 inserted in a peg slot 68, a pulse will be transmitted by the control unit 10 and received by the dog 16 when the control unit is activated. Each pulse received causes the dog's mouth 30 to open and a barking sound to be emitted therefrom.

The cycle-timer switch within the remote toy will cause the toy to go through one cycle of operation in response to each pulse received. This avoids the necessity to provide the transmission of a more complex control signal.

Preferably, the period of the cycle-timer switch in the answering toy will be less than the minimum time interval between the transmitted pulses; so that a full cycle of operation of the toy can occur in response to each pulse transmitted by the control unit. In the embodiment described a cycle of operation of the transmitting mechanism, i.e., the cycle-timer, is approximately nine seconds. The time between adjacent peg slots, through which the projecting portion of the rotating switch actuator sweep, is approximately .9 second. The toy actuating switch remains closed for approximately .3 second and the cycle-timer located in the answering toy has a cycle of operation of approximately .5 second. There is a sufficient spacing between adjacent peg slots to allow the cycle-timer in the answering toy to complete its cycle of operation before another pulse can be transmitted thereto by the control unit.

Thus, I have provided an "intelligent" toy capable of responding by a counting action to instructions of a child. Alternatively, if desired, the control unit may provide for some form of random selection by the child so that the child may be surprised by the number of actions of the remote controlled toy.

It is to be understood that modifications may be made in the features of the present invention as well as its adaptation for use in other toys without departing from the spirit or scope of my invention.

What is claimed:

1. An educational game adapted to perform a pre-cycled function one or more times in response to a setting by a user, said game including a motor-actuated toy, a remote-control unit electrically connected to said toy, means in said toy for actuating same for a cycle of operation in response to an electrical signal, a cycle-timer in said control unit, signal-producing means associated with said cycle-timer for producing one or more of said electrical signals during each cycle of operation of said cycle-timer, and means for pre-setting the number of said signals produced during each said cycle of operation of said cycle-timer, whereby said control unit may be pre-set, and, when actuated, will send electrical signals to said toy to cause it to operate for the pre-set number of cycles of operation.

2. An educational game as set forth in claim 1 in which the time period of the cycle of operation of said toy is less than the time period between the signals produced during operation of said cycle-timer.

3. A remotely-controlled educational game adapted to perform a pre-cycled function one or more times in response to a single actuation by a child, said game including a motor activated toy, means comprising a cycle-timer therein to actuate said toy for a pre-determined cycle of operation in response to an electrical pulse, a control unit remote from said toy but electrically connected thereto, a pulse transmitter in said control unit to transmit one or more pulses to said toy, said pulse transmitter including a cycle-timer, a switch controlled by said child for actuating said pulse transmitter cycle-timer, and a pulse control means, pre-set by said child, for predetermining the number of pulses generated during each cycle of said pulse transmitter cycle-timer, whereby said child may pre-set said pulse transmitter for a particular number of pulses, actuate said switch, and have said toy thereby perform the pre-set number of pre-cycled operations.

4. A remotely-controlled educational game as set forth in claim 3 in which the period of said pre-cycled operation of said toy is less than the time period between pulses generated by said pulse transmitter.

5. A remotely-controlled educational game as set forth in claim 3 in which said pulse transmitter includes a motor to operate said pulse transmitter cycle-timer and a switch-actuator associated with said motor, said switch-actuator being adapted to cause intermittent actuation of said pulse transmitter.

6. A control unit for a child's educational toy in combination with an animated toy operated by said control unit, said animated toy being adapted to move through one cycle in response to the receipt of an electrical pulse, said control unit including a cycle-timer actuated by said child, an actuator associated with said cycle-timer for producing pulses during a cycle of said cycle-timer, and pre-setting means associated with said actuator to pre-set the number of pulses produced during said cycle, whereby the child may pre-set said control unit and said animated toy will move through a pre-determined number of cycles in response thereto.

7. A remotely-controlled educational game including a remotely-controlled toy which operates through one or more cycles as a result of action taken by a child, said game further including a control unit having a motor located therein, a rotatable switch actuator operatively associated with said motor, said rotatable switch actuator positioned to rotate along a predetermined arc, said arc having at least one removable actuator interruptor located thereon, said rotatable switch actuator being positioned relative to said interruptor so that when said actuator is rotated said interruptor is temporarily engaged by said rotatable switch actuator, a normally open toy actuating switch positioned in operative relation to said rotatable switch actuator so that when said rotatable switch actuator temporarily engages said interruptor said toy actuating switch is closed whereby an energy pulse is applied to said toy until said actuator rotates past said interruptor moving said switch contact away from engagement with said toy actuating switch.

8. A remotely-controlled game as set forth in claim 7 wherein said rotatable switch actuator is slidably mounted to an actuator shaft, said actuator shaft is operatively associated with said motor, and said interruptors include pegs adapted to be insertable into predetermined peg slots positioned along said arc, whereby when said rotatable switch actuator rotates through said peg slots and engages a peg it slides rearward forcing said rotatable switch actuator to engage said toy actuating switch.

9. A remotely-controlled toy, in combination with a control unit, said toy being responsive to said control unit, said control unit being adapted to emit a predetermined number of electrical pulses when started by a child, said toy including a cycle-timer to receive said pulses, said cycle-timer being adapted to operate for one cycle in response to each pulse received, a motor in said toy, mechanical means associated with said motor to animate said toy, said motor being controlled by said cycle-timer whereby said toy is animated for one cycle of operation of said cycle-timer in response to each pulse transmitted from said control unit.

10. A remotely-controlled toy, in combination with a control unit, said toy being responsive to said control adapted unit, said control unit being to emit a predetermined number of electrical pulses when started by a child as set forth in claim 9 wherein said toy includes a head having upper and lower portions, said upper portion pivotally connected to said lower portion, said mechanical means includes a cam operatively associated with said motor arranged in said lower head portion, a cam follower rigidly attached to said upper head portion but pivotable relative to said lower head portion when engaged by said cam, a bellows rigidly mounted in said upper head portion, and a bellows actuator rigidly mounted to said lower head portion positioned proximate to said bellows, whereby when said cycle-timer receives a pulse from said control unit said motor rotates said cam into engagement with said cam follower pivoting the upper head portion relative to the lower head portion moving said bellows into engagement with said bellows actuator causing a sound to be emitted from said head.

References Cited

UNITED STATES PATENTS

| 2,508,146 | 5/1950 | D'Elia | 46—232X |
| 2,619,349 | 11/1952 | Abrahamson | 46—232X |
| 3,252,247 | 5/1966 | Miller | 46—232X |
| 3,340,623 | 9/1967 | Troffa | 35—31 |

ROBERT PESHOCK, Primary Examiner

D. L. WEINHOLD, JR., Assistant Examiner

U.S. Cl. X.R.

46—232